United States Patent [19]

Oury et al.

[11] Patent Number: 4,875,569
[45] Date of Patent: Oct. 24, 1989

[54] CONCRETE DELIVERY SYSTEM

[75] Inventors: Robert F. Oury, Gilberts; Joseph Gallione, Naperville, both of Ill.

[73] Assignee: Rotec Industries, Inc., Elmhurst, Ill.

[21] Appl. No.: 181,735

[22] Filed: Apr. 14, 1988

[51] Int. Cl.[4] .................................. B65G 47/44
[52] U.S. Cl. ............................ 198/36 D; 193/22; 193/29; 198/536; 198/565; 198/569; 22/482
[58] Field of Search .................... 193/22, 23, 29; 198/360, 311, 535, 536, 565, 566, 569; 222/481, 482

[56] References Cited

U.S. PATENT DOCUMENTS

| 747,897 | 12/1903 | Spangler | 198/536 X |
|---|---|---|---|
| 1,633,627 | 6/1927 | First | 198/536 |
| 2,633,255 | 3/1953 | Hoffstetter | 198/566 X |
| 3,114,479 | 12/1963 | Keeney | 222/482 |
| 3,157,313 | 11/1964 | Sarmento et al. | 222/482 |
| 3,171,534 | 3/1965 | Oury | 198/569 X |
| 3,532,252 | 10/1970 | Brock | 222/482 |
| 4,218,168 | 8/1980 | Parsons | 198/536 X |
| 4,377,230 | 3/1983 | Bürkner | 198/569 X |
| 4,754,869 | 7/1988 | Hutchison et al. | 298/536 |

FOREIGN PATENT DOCUMENTS

| 2149139 | 4/1972 | Fed. Rep. of Germany | 193/29 |
|---|---|---|---|
| 3533201 | 3/1987 | Fed. Rep. of Germany | 198/566 |
| 508456 | 5/1976 | U.S.S.R. | 198/535 |

Primary Examiner—Robert J. Spar
Assistant Examiner—D. Glenn Dayoan
Attorney, Agent, or Firm—Allegretti & Witcoff, Ltd.

[57] ABSTRACT

An apparatus for delivering concrete to two spaced deposition points having a funnel-shaped hopper with a pair of outlets in the bottom which deposit concrete on conveyors. An inclined chute feeds concrete to the inner conical wall of the hopper as the chute rotates to minimize segregation of the concrete. Each outlet has a gate to control flow of the concrete to the conveyor beneath.

To divert concrete from the hopper a side discharge chute is pivotally mounted in the conical wall of the hopper and can be tilted to receive concrete discharged from the inclined chute.

8 Claims, 5 Drawing Sheets

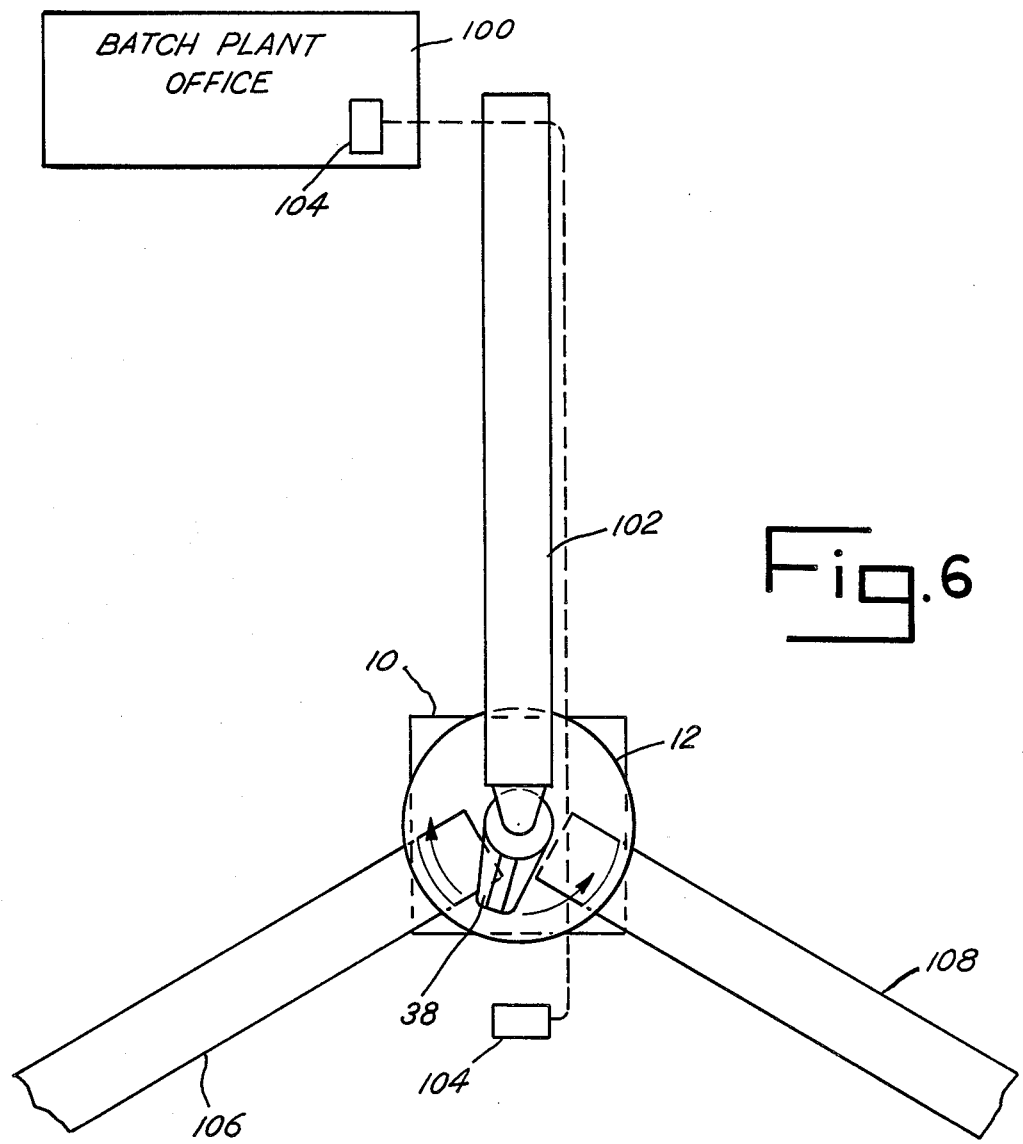

CONCRETE DELIVERY SYSTEM

This invention relates to a concrete delivery apparatus which permits carrying concrete from a batch plant to two or more spaced discharge pouring sites and to a novel hopper construction for feeding concrete to a plurality of different belt conveyors. The delivery system is especially suitable for pouring concrete dams.

Belt conveyors are well-known for transporting concrete to pouring sites as, for example, in constructing dams. The concrete is discharged from the mixing drum of a truck or directly from a batch plant through a chute or the like onto the belt of the conveyor. The conveyor, or a plurality of conveyors in series, carries the concrete to the point of deposition. Hoppers with variable sized outlets for controlling the flow of concrete from its source to the conveyor are also known.

Hoppers used in previously known delivery systems were designed to feed one conveyor only. Such hoppers had no means of disposing of concrete which did not meet specifications. As a result, the non-conforming concrete had to be dumped outside the form or pouring area at the discharge end of the conveyor, usually where it was not wanted and could not be easily picked up and discarded elsewhere.

The object of the invention is to provide a concrete delivery system which will convey concrete from a single source to a plurality of delivery sites, the volume of concrete conveyed to each site being independently controlled. Another object is to provide means for diverting non-standard concrete to a container for disposal rather than discharging it on the conveyor leading to the pouring site. Another object is to provide feed means which minimizes separation of the concrete before discharging it to the delivery conveyors.

In one form of the invention, the apparatus comprises a funnel shaped hopper having two opposed outlet openings in the hopper wall, each opening having a sliding gate to control the volume of concrete discharged through the outlet. The gates may be opened and closed independently of each other. Belt conveyors are disposed beneath each outlet to carry the concrete to different pouring sites. This apparatus provides the necessary flexibility in the amount of concrete delivered at the pouring site because of change in workloads, schedules, breakdowns and the like.

A feed conveyor comprising part of the system carries the concrete to the top of a funnel shaped hopper. The conveyor includes a hood to deflect the concrete downwardly. The feed conveyor has a rotary or swivel chute at its delivery end, disposed at an angle to the vertical, which deposits the concrete evenly around the conical side wall of the hopper. This eliminates a free fall condition which minimizes concrete segregation and also allows for even wear on the hopper wall.

In the event the concrete is improperly mixed or does not meet minimum specifications for some reason, it must be discarded before reaching the pouring form. To discard it at the pour site is not practical. In accordance with the invention, concrete passing through the rotary chute can be diverted from the hopper through a side discharge or waste chute extending into the hopper through the hopper wall. The side discharge chute is pivotally mounted so that it can be tilted toward the center of the hopper in line with the end of the rotary chute. Hydraulic control means are provided to tilt the side discharge chute toward the center of the hopper and simultaneously to arrest rotation of the rotary or swivel chute with its outlet directly above the inlet of the side discharge chute. The concrete flows from the side discharge chute to a container, for example, a dump truck, for disposition.

IN THE DRAWINGS

FIG. 6 is a diagram showing the flow of concrete from the batch plant to the two conveyors beneath the hopper.

Figure 1:
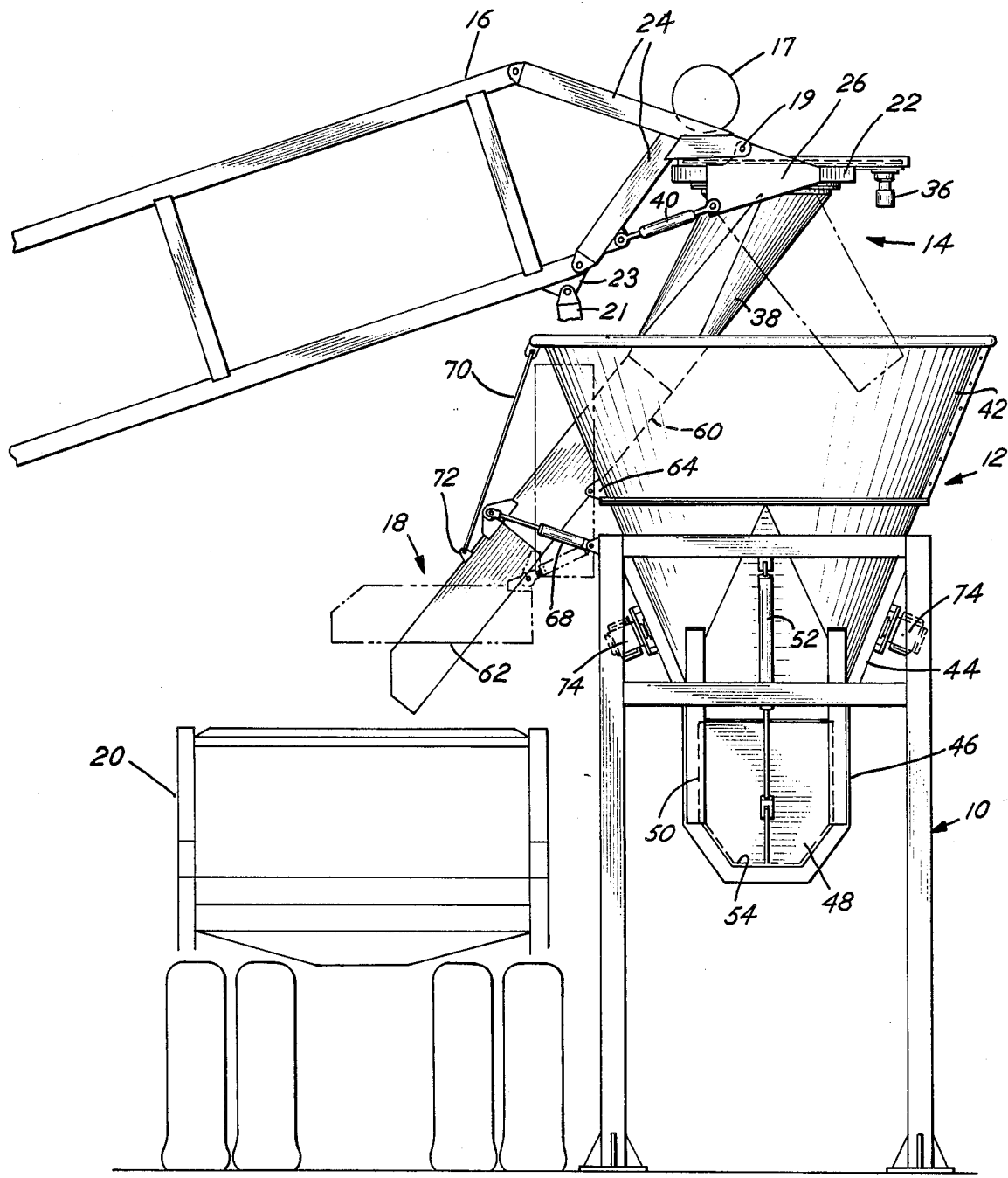
FIG. 1 is a front elevational view of the apparatus of the invention showing the rotary chute, the hopper, the side discharge chute and a truck for receiving the discarded concrete.
Figure 2:
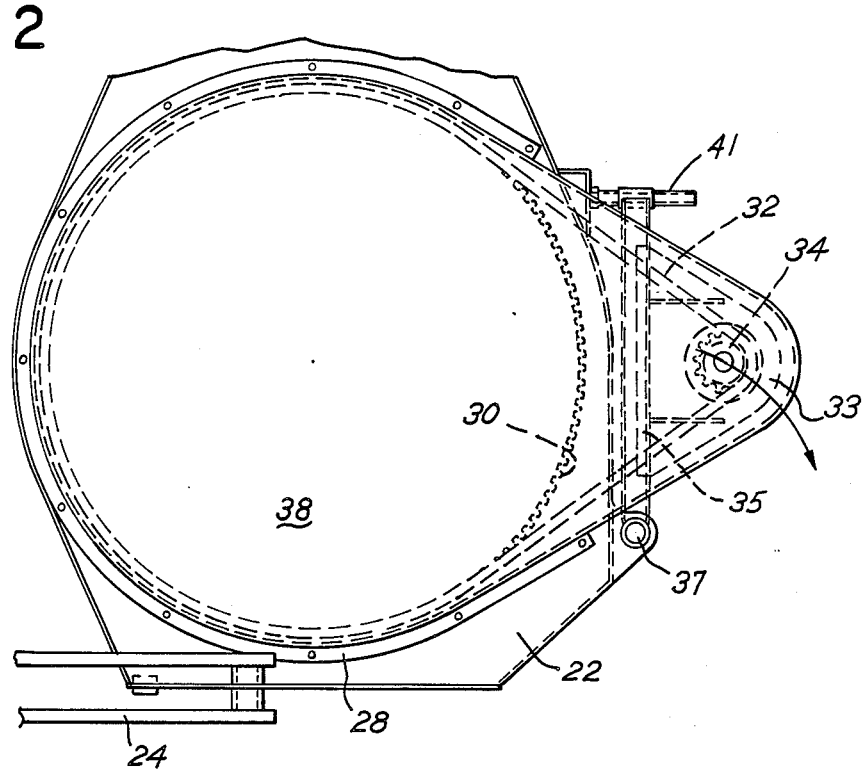
FIG. 2 is a plan view of the support and drive means for the rotary chute.
Figure 3:
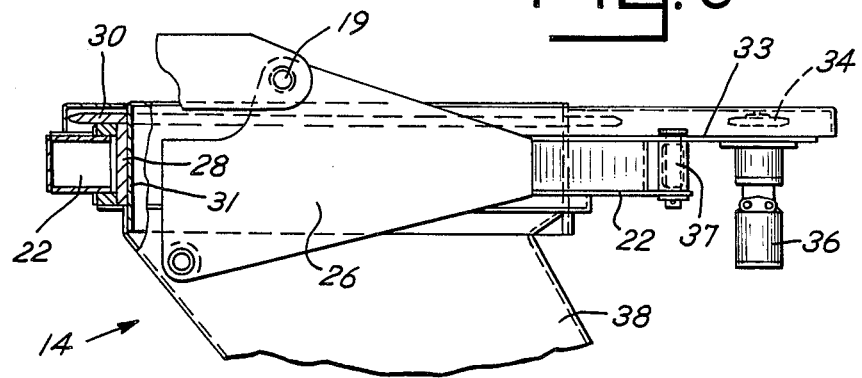
FIG. 3 is a side view of the support and drive means for the rotary chute, partly in section.
Figure 4:
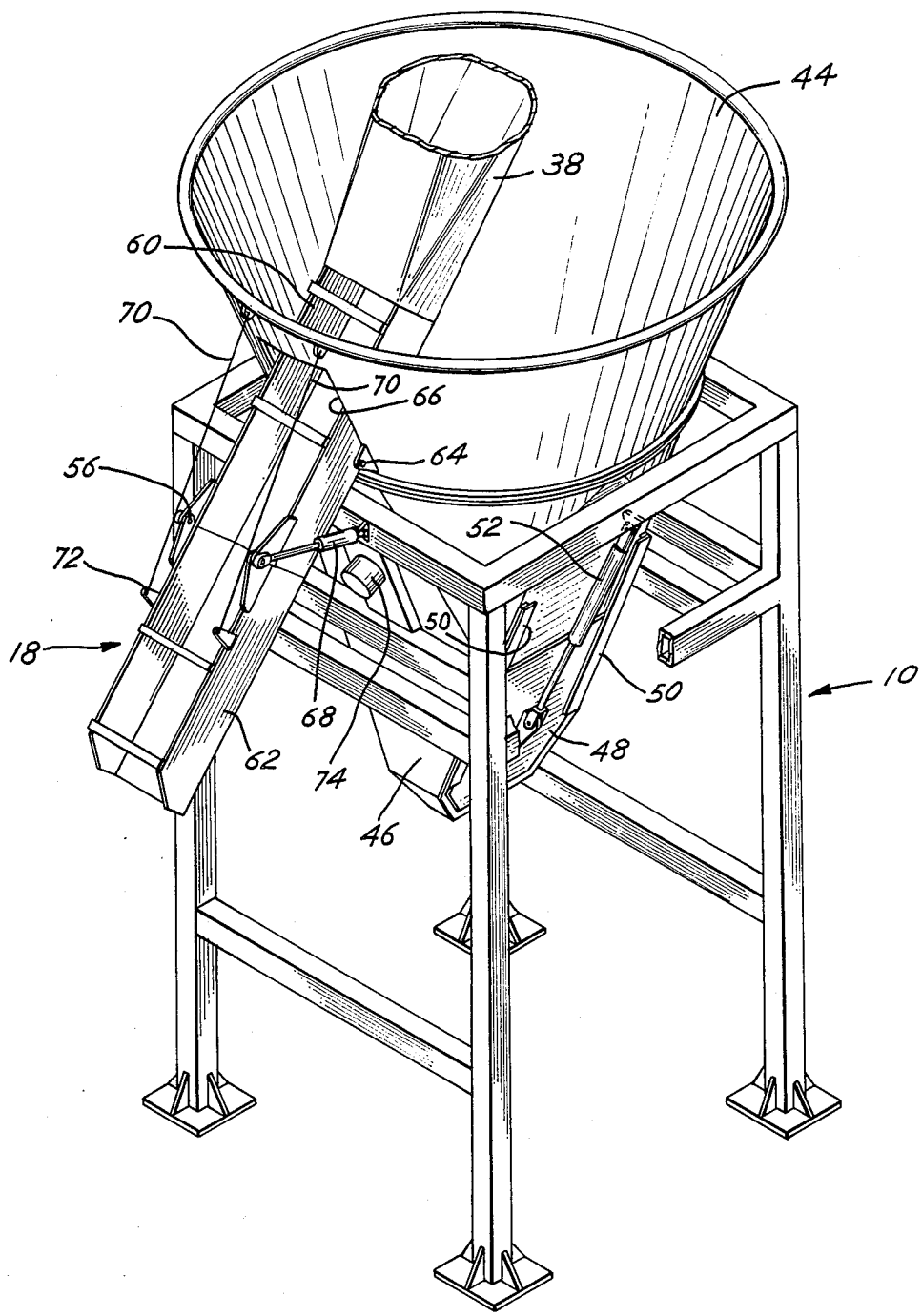
FIG. 4 is a perspective view of the hopper and the side discharge chute, the latter being aligned with the discharge end of the rotary chute.

Referring to FIG. 1 the hopper designated generally at 12 holds about 25 cubic yards of concrete and is supported on a structural tubing frame 10. The swivel chute designated generally at 14 is suspended cantilever fashion from a truss 16 which supports a concrete delivery conveyor belt (not shown) which is trained around the roller 17 at the upper end thereof. The upper end of the truss 16 carrying the delivery conveyor may be supported at its upper end by means of a pair of upright frame members 21 comprising part of the frame 10 and connecting to ears 23 by means of pins. A conventional hood (not shown) directs downwardly the concrete being discharged from the end of the belt on the delivery conveyor. The waste or side discharge chute designated generally at 18 is pivotally mounted in the side wall of the hopper as best shown in FIG. 4. In use, the chute 18 directs non-standard concrete into a truck 20 for disposition elsewhere. Rotary or swivel chute 14 has an open trough 38 mounted for rotation on a double plate 22 (FIGS. 2 and 3). The circular vertical wall or ring 28 has an inner bearing surface in which the flange 31 of a driven sprocket 30 rotates. The flange 31 is bolted to the top of the chute 38. The plate 22 is secured at opposed sides by brackets 26 which connect to the end of the support arms 24 in a pivotal connection 19. A turnbuckle 40 extends between the lower member of the truss 16 and the lower end of the bracket 26 to facilitate adjusting the inclination of the plate support 22. A chain 32 driven by a sprocket 34 by means of a hydraulic motor 36 serves to rotate the swivel chute through the flange 31 of driven sprocket 30. The sprocket 34 is mounted in a bearing on a generally triangular-shaped plate 33 extending from shaft 35 pivotally mounted on plate 22 by means of a pin 37. A tensioning bolt 41 at the opposite end of shaft 35 permits the chain 32 to be tightened by rotating the drive sprocket 34 about pin 37 in the direction of the arrow.

The trough 38 is of sufficient length to cause the concrete to fall on the inclined side wall of the upper portion 42 of hopper 12. This reduces the distance of free fall and minimizes the tendency of the concrete to separate. The rotation of the swivel trough distributes the concrete equally around the wall of the hopper and causes the wear to be uniform around the entire circumference. Preferably, the trough is inclined at an angle of about 50° from the vertical center line of the hopper.

The funnel shaped hopper has an intermediate section 44 which carries a pair of vibrators 74. The bottom section 46 of the hopper is V-shaped and has flat opposed walls as best shown in FIG. 4. There are two identical walls, one on either side of the hopper. Each has an outlet 54 which is closed by means of a sliding gate 48 mounted in ways 50 at its side edges. The gates 48 may be independently opened and closed by means of a hydraulic cylinder 52 which is remotely controlled as described below. Inside the bottom of the hopper between the outlets 54 is an inverted V deflector (not shown) which divides the concrete flow to opposing outlets.

The waste chute 18 comprises two sections: an upper section 60 and a lower section 62. The two sections are joined pivotally by a pair of pins 56 extending through cooperative ears, one on each of the sections. A pair of hydraulic cylinders 68 connect to the pins 56, which cylinders when extended, cause the waste chute to be tilted about pivots 64 so that the upper section 60 is inclined toward the center of the hopper. When the cylinders 68 are retracted, the upper section 60 assumes the vertical position shown in dot and dash lines in FIG. 1. Simultaneously the lower section assumes a horizontal position as it rotates about the pivot points 72 which connect to the top edge of the upper section 44 of the hopper through cables 70. When the waste chute is tilted to the position shown in FIG. 4, the top end of section 60 becomes aligned with the lower end of trough 38. This connection provides a continuous path for the concrete discharged from the end of the feed conveyor into the swivel chute to the truck 20 or other container for waste material. By means of the controls described below the rotary chute is arrested at the point where it becomes aligned with the side discharge chute 18. In normal operation when the swivel chute is rotating, the side discharge chute is in the position shown in dot and dash lines in FIG. 1.

To insure smooth flow of concrete through the openings 54, a pair of vibrators 74 are disposed in the wall of intermediate portion 44 of the hopper between the two outlets 54. A suitable vibrator may be purchased on the market as a Martin T-300 Impactor.

Figure 5:
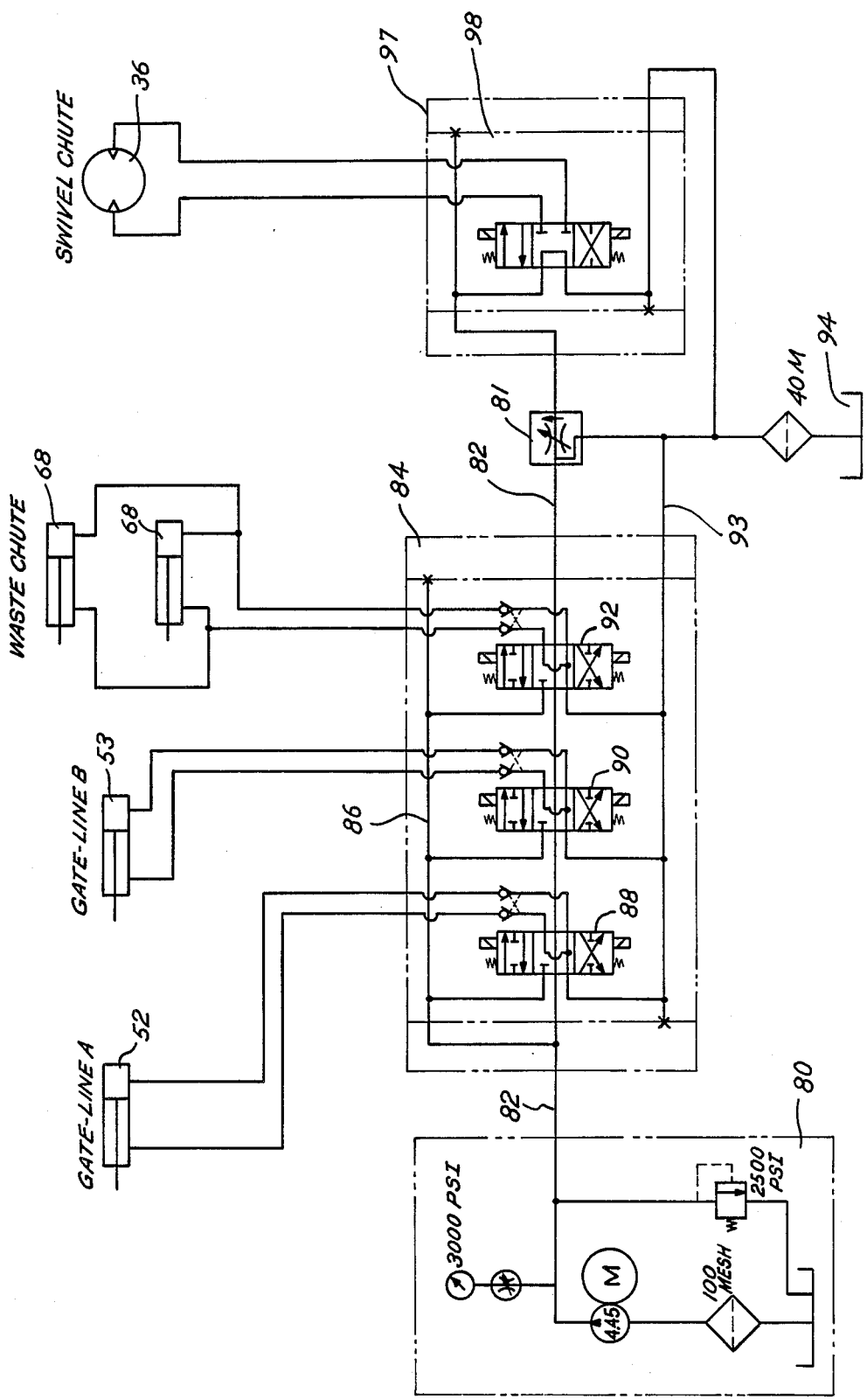
FIG. 5 is a circuit diagram of the hydraulic controls for the hopper gates, the side discharge or waste chute and the rotary or swivel chute.

FIG. 5 illustrates diagrammatically the hydraulic control means for controlling the gates in the bottom of the hopper, the operation of the waste chute and the rotation of the swivel chute. A five horse power hydraulic power unit 80 generates fluid under pressure at 2,500 psi by means of a pump which has a capacity 4.45 gallons per minute. The highly-pressurized fluid flows through the line 82 to solenoid directional control valves 88, 90, 92 and to a similar valve 98 for controlling the swivel chute. The valves are enclosed in housings 84, 97. Flow control valve 81 in the line 82 permits hydraulic fluid not needed for operation of the gates and chutes to bypass the control valves. Directional control valve 88 supplies hydraulic fluid to first gate 51. By controlling the solenoids, the fluid can be directed to the rod end or to the piston end of the cylinder 52 depending upon which direction the gate is to travel. If pressurized fluid enters the rod end, the fluid in the piston end flows out of the cylinder back to line 93 and into a reservoir 94 through a filter. The fluid is recirculated from the reservoir 94 back to the hydraulic power unit 80. The position of gate 52 can be controlled from fully closed to fully open positions.

In similar manner, the second gate 53 is controlled by means of the solenoid directional control valve 90. Waste chute 18 has two hydraulic valves 68, which operate in unison. Solenoid control valves 92 release fluid to the rod end or the piston end of the hydraulic pistons 68 depending upon whether the chute 18 is to be in operative inclined position or stored position.

The swivel chute is rotated at about two rpm by means of the hydraulic motor 36 controlled by solenoid directional control valve 98. The motor can be operated so that the swivel turns in one direction or in the reverse direction. The control valves are enclosed in boxes 84 and 97.

The housings or boxes may be located in the batch plant or directly on the hopper frame. By pressing buttons, the operator can control the flow of concrete from each of the outlets 54 through gates 52, 53, depending upon the volume of concrete required at the ends of the two conveyors receiving the concrete from the hopper. If desired, all of the concrete may be discharged onto one conveyor. Also, by the press of a button, the waste chute 18 can be tilted, the swivel chute arrested in its rotation so that it lines up with the waste chute and concrete to be discarded is then directed to the container 20.

Flow control valve 81 permits hydraulic fluid to bypass when the pressure is in excess of that required for operation of the gates and the chutes.

Referring to FIG. 6, batch plant 100 mixes concrete which is carried by feed conveyor 102 to hopper 12. By means of identical hydraulic controls 104 located at the batch plant and at the hopper, the flow of concrete can be directed to one or both of the conveyors 106, 108 in desired volume.

What is claimed is:

1. Apparatus for delivering concrete to two spaced deposition points comprising:
    a funnel-shaped hopper having a conical side wall,
    a pair of opposed outlet openings in the hopper wall at the lower end thereof,
    two doors each slidably mounted on said hopper wall adjacent each said outlet openings,
    actuating means for moving said doors from fully closed to fully open positions for metering the volume of concrete discharged from said openings,
    separate conveyor means disposed below each of said openings for carrying concrete from the hopper to spaced deposition points,
    an inclined rotatable chute disposed above said hopper for discharging concrete into said funnel-shaped hopper,
    said inclined rotatable chute being tilted at an angle from the vertical so as to deposit the concrete evenly on the conical side wall of said funnel-shaped hopper as said chute rotates and a means for rotating said rotatable chute.

2. The apparatus of claim 1 which includes a truss member supporting a feed conveyor having a discharge end above said hopper, said rotatable chute being suspended from said truss member, and means connecting said chute to said truss which permits adjusting the inclination of said chute.

3. The apparatus of claim 2 in which said connecting means includes a turn buckle.

4. The apparatus of claim 1 which includes a truss member having one end disposed above said hopper, means for supporting said rotatable chute connected to said truss member, a driven sprocket mounted for rotation on said support means, said sprocket being rigidly secured to the top of said rotatable chute, a driving sprocket mounted on said support means, a hydraulic motor connecting to said driving sprocket and a chain connecting said driving sprocket to said driven sprocket to rotate said chute.

5. Apparatus for delivering concrete to two spaced position points comprising:

a funnel-shaped hopper, a pair of opposed outlet openings in the hopper wall at the lower end thereof, two doors each slidably mounted on said hopper wall adjacent each said outlet openings, actuating means for moving said doors from fully closed to fully open positions for metering the volume of concrete discharged from said openings, separate conveyor means disposed below each of said openings for carrying concrete from the hopper to spaced deposition points, an inclined rotatable chute disposed above said hopper for discharging concrete into said funnel-shaped hopper, a side discharge chute extending through the wall of said funnel shaped hopper near to the top thereof and control means for aligning said rotating chute with said discharge chute whereby concrete is diverted to a point outside said hopper.

6. The apparatus of claim 5 in which said side discharge chute is pivotally mounted in the hopper wall to permit tilting toward the center of said hopper to align with the discharge end of said rotatable chute when concrete is to be diverted, and tilting to a vertical position out of the path of the concrete discharged from said discharge chute.

7. The apparatus of claim 6 which includes means for tilting said side discharge chute and in which said side discharge chute has an extension pivotally attached to the end of said side discharge chute outside said hopper wall and includes means for moving said extension to a substantially horizontal position when said side discharge chute is tilted to said vertical position.

8. The apparatus of claim 7 in which said tilting means comprise hydraulic cylinders.

* * * * *